Patented Oct. 15, 1935

2,017,089

UNITED STATES PATENT OFFICE 2,017,089

OPERATING FLUID FOR HYDRAULIC TRANSMISSION

John C. Cox, St. Louis, Mo., assignor to Wagner Electric Corporation, St. Louis, Mo., a corporation of Delaware No Drawing. Application July 16, 1934, Serial No. 735,445

3 Claims. (Cl. 252—5)

My invention relates to hydraulic power transmission apparatus of the "fluid clutch" type in which a rotary driving member transmits torque to a juxtaposed driven member by means of an operating liquid actuated by the driving member and impinging upon the driven member. Constructions of the type referred to are shown, for example, in Föttinger Patent No. 1,999,359 and Salerni Patent No. 1,863,128. My invention relates more particularly to an operating fluid for such apparatus.

A fluid for the purpose referred to should possess a number of characteristics such as low viscosity throughout a wide temperature range, low freezing point, and high boiling point. It should be non-corrosive to metallic bearings and non-inflammable.

A further very desirable characteristic is that it have relatively high specific gravity, that is to say, higher gravity than mineral oil which has usually been heretofore employed as the operating liquid for such couplings, since the increase in specific gravity permits reduction in the diameter of the driving and driven elements for a given torque range and, therefore, a substantial reduction in cost of the apparatus.

I have found that a liquid comprising mainly alpha-chlornaphthalene ($C_{10}H_7Cl$) and whose specific gravity at 20 degrees C. is approximately 1.2, has the essential characteristics above mentioned.

It is preferred that the liquid also embody a fluid lubricant for satisfactory bearing lubrication, and such lubricant may be a fatty oil or mineral oil. The present preferred formula for my new operating fluid is approximately 80% alpha-chlornaphthalene and approximately 20% mineral oil, the specific gravity of a fluid made in accordance with this formula being approximately 1.15.

Having fully described my invention, what I claim as new and desire to secure by Letters Patent of the United States is:

1. An operating fluid for a fluid clutch, comprising alpha-chlornaphthalene and a fluid lubricant.

2. An operating fluid for a fluid clutch, comprising alpha-chlornaphthalene and mineral oil.

3. An operating fluid for a fluid clutch, which consists of approximately four parts by volume of alpha-chlornaphthalene to one part by volume of mineral oil.

JOHN C. COX.